United States Patent Office 3,317,139
Patented May 2, 1967

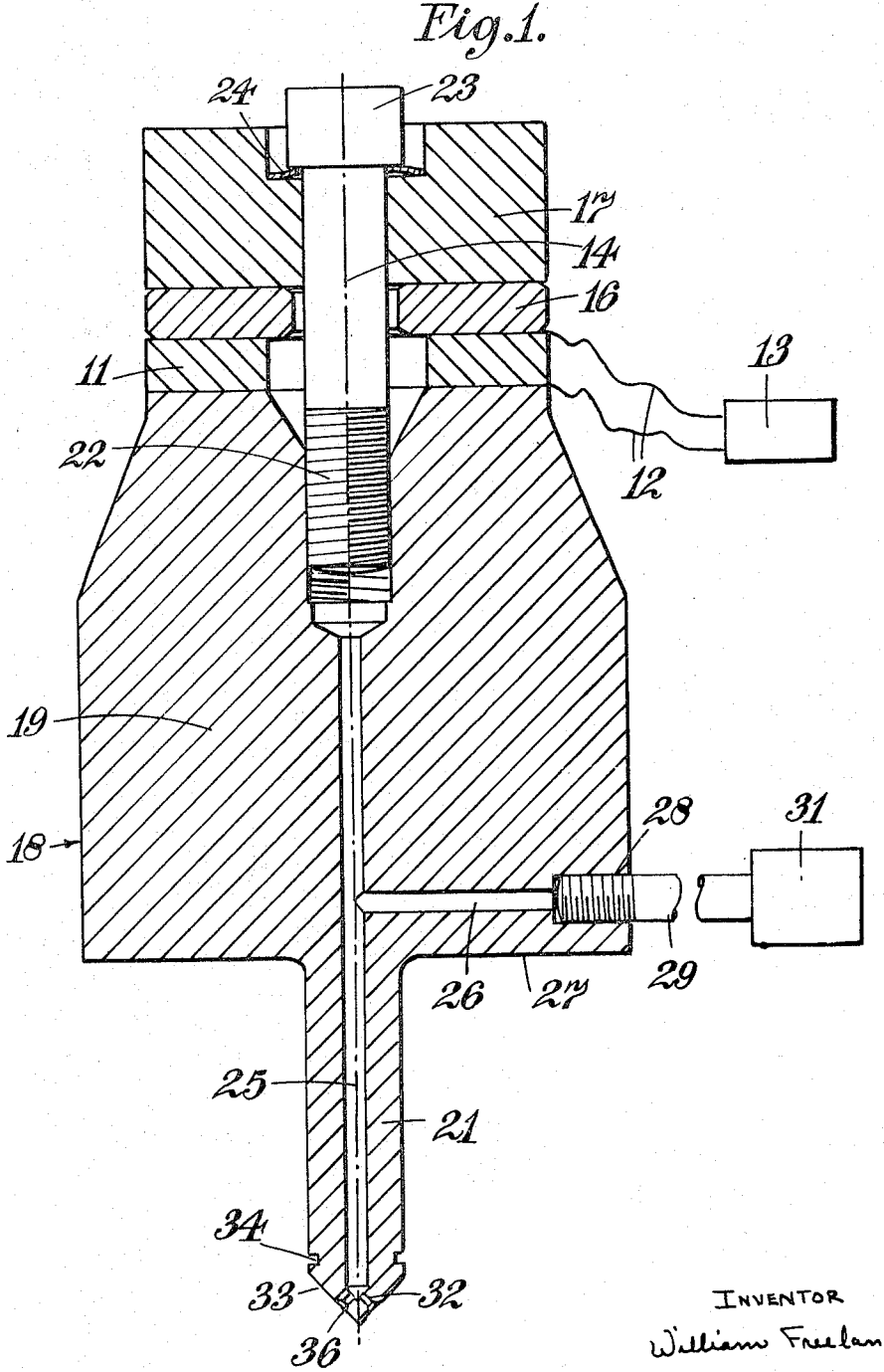

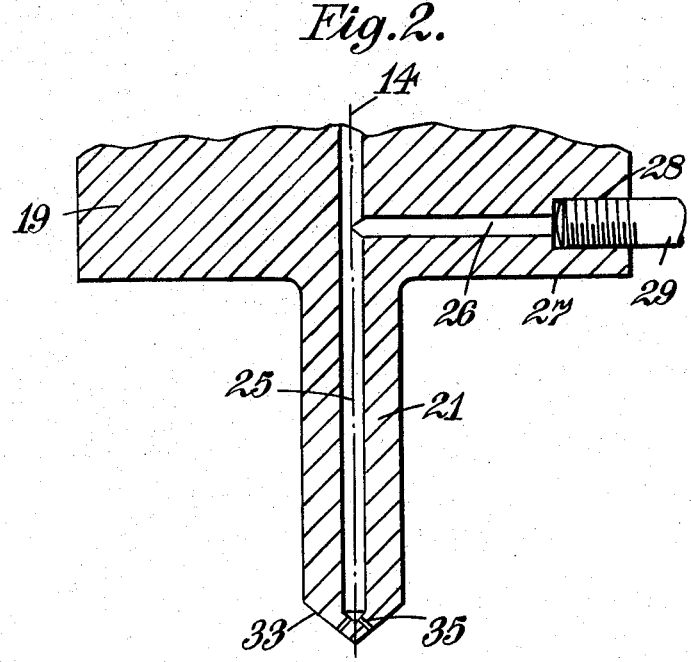
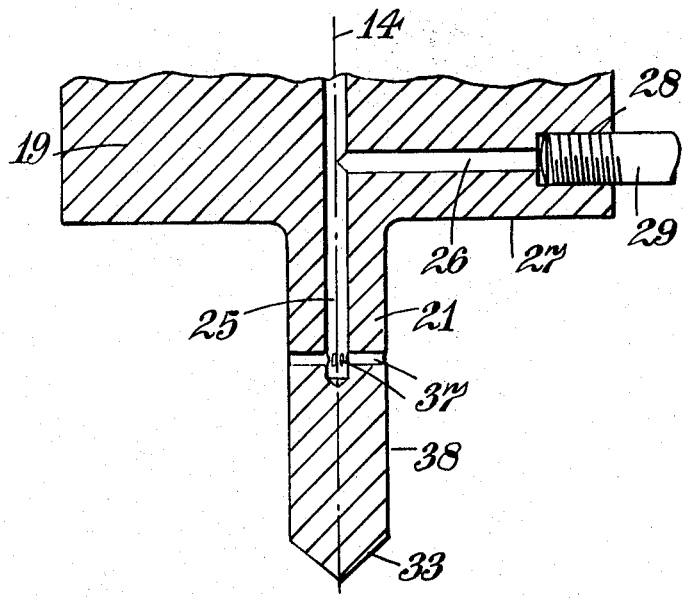

3,317,139
DEVICES FOR GENERATING AND DELIVERING MECHANICAL VIBRATIONS TO A NOZZLE
William Freeland, Esher, England, assignor to Simms Group Research & Development Limited, London, England, a British company
Filed Apr. 13, 1965, Ser. No. 447,634
8 Claims. (Cl. 239—102)

The present invention relates to improvements in devices for generating and delivering ultrasonic mechanical vibrations and is more particularly, but not exclusively, concerned with velocity transformer devices for use with ultrasonic vibration generators.

Vibrations in the frequency range referred to as the ultrasonic frequency range may be generated by a suitable generator, for example, a piezo-electric crystal fed with suitable electrical signals. By means of a coupled velocity transformer, comprising first and second members of dissimilar cross-section, there may be attained an amplification in the second member of smaller cross-section of the oscillations induced in the first member of larger cross-section. In such velocity transformers the cross-section of the first and second members or of one of the said members may vary with distance along the axis of the transformer.

The vibrational energy of an ultrasonic generator device with a coupled velocity transformer may be utilised in the atomisation of liquids, for example the atomisation of fuel oil for burners.

The present invention provides a velocity transformer device for use with an ultrasonic frequency vibration generator, which device comprises a first conduit adapted to carry liquid and disposed axially of the velocity transformer member of smaller cross section, and a second conduit adapted to carry liquid and disposed transversely of the first conduit, through which second conduit liquid can be fed to flow therethrough and then through the first conduit to or adjacent an end part of the velocity transformer member of smaller cross-section.

Preferably the second conduit is disposed in the velocity transformer member of larger cross-section, with that end thereof which is remote from the first conduit being adapted for liquid to be fed thereto to flow through the second conduit as aforesaid.

The first conduit may be connected to a plurality of divergent bores which open onto a surface or surfaces of the velocity transformer member of smaller cross-section at or adjacent an end part thereof as aforesaid. The bores may extend radially of the axis of the velocity transformer member of smaller cross-section. Alternatively, the bores may extend obliquely to the axis of the velocity transformer member smaller cross-section, and the said member has a conical surface at or adjacent its end onto which surface the bores open.

Alternatively, the first conduit may be connected to a plurality of divergent bores which open onto a surface or surfaces of the velocity transformer member of smaller cross-section remote from the said end part thereof, the arrangement being such that, when the device is suitably positioned and in operation, liquid emerging from the bores is carried to the said end part by gravity.

The invention includes the combination with a velocity transformer device as aforesaid with an ultrasonic frequency vibration generator coupled thereto.

The invention also includes an ultrasonic liquid feeding and vaporisation device incorporating a velocity transformer device as aforesaid or the combination therewith of an ultrasonic frequency generator as aforesaid.

The invention also includes an oil burner incorporating a device as aforesaid.

A specific embodiment of the invention, together with some modifications thereof, will now be described by way of example and with reference to the accompanying drawings in which:

FIGURE 1 is an axial cross-section through part of an oil fuel burner incorporating an ultrasonic velocity transformer, and FIGURES 2 and 3 are axial cross-sections through parts of velocity transformers which are modifications of that shown in FIGURE 1.

In the example illustrated in cross-section in FIGURE 1, the oil burner includes an ultrasonic frequency vibration generator. This includes an annular crystal 11 which is fed with electrical signals along cables 12 from an electrical signal generator 13. The crystal is thus caused to expand and contract at an ultrasonic frequency along the axis 14 of the device. The crystal is backed by an insulator 16, which may be a glass insulator, and a backing plate 17 which may be of aluminium. A velocity transformer device 18 comprises a first member 19 of larger cross-section and a second member 21 of smaller cross-section. The members 19 and 21 are formed integrally of aluminium. A bolt 22 is threaded into the member 19 and has a head 23 bearing against a Schnorr spring disc 24 to clamp the crystal 11 to the first member 19 of the velocity transformer.

A first conduit 25 for liquid (i.e. fuel oil) is disposed axially of the second velocity transformer member 21 and extends into the first velocity transformer member 19 back to the blanking off face for the bolt 22 which seals that end of the conduit. A second conduit 26 for liquid is disposed perpendicularly to the axis 14 of the velocity transformer, the conduit 26 being as close as practicable to the face 27 of the first member 19 which is adjacent the second member 21, which face 27 functions as a node when the device is operating.

Liquid (i.e. fuel oil in this example) can be fed through the conduit 26 through the outer end 28 thereof which is adapted to be connected to a pipe 29 and feed pump 31. The liquid then flows through conduit 25 to emerge through holes 32 extending obliquely from axis 14 and drilled and countersunk at 36 in the cone-shaped tip end surface 33 of the velocity transformer member 21 this tip end operating as an anti-node. An annular groove 34 adjacent the cone-shaped tip end serves to atomise liquid drops which may be caught in the groove. When the generator crystal 11 is actuated, the tip end 32 of the velocity transformer vibrates at an ultrasonic frequency and atomises the fuel oil emerging from the bores 32. This vapour is ignited and burns.

In the modification illustrated in FIGURE 2, the conduit 25 has eight holes 35 radiating from it, obliquely of the axis 14. The holes are of substantially constant diameter and emerge perpendicularly to the cone-shaped tip end 33 of the velocity transformer member 21. These holes are not countersunk.

In the modification illustrated in FIGURE 3, the conduit 25 has eight holes 37 of substantially constant diameter radiating from its end part perpendicularly to the axis 14. These eight radial holes open on to the cylindrical surface 38 of the member 21 remote from the cone shaped tip end 33 of the velocity transformer member 21. The liquid emerging from these radial holes is carried due to gravity (the device being disposed with the axis 14 vertical and the member 21 with its end tip 33 downward) to the cone-shaped end tip 33, where it is atomised.

The example oil burner and velocity transformer device, and modifications thereof, described above, are advantageous in that fuel is fed to the burner, and vapourized, efficiently.

The invention is not restricted to the details of the foregoing example.

I claim:
1. A velocity transformer device for atomizing liquid with ultrasonic frequency vibrations from an ultrasonic frequency vibration generator, said transformer device comprising first and second body members, the first body member being of larger cross section than the second body member, vibration means for coupling said generator to said first body member at a position remote from the second body member, the second body member having a projecting end remote from the first body member, said end having outwardly facing tapered atomizing faces inclined to the longitudinal axis of the device, a first conduit extending transverse to said axis of the device for receiving said liquid, a second conduit in communication with the first conduit and extending along said axis through at least a part of said second body member, said first and second conduits forming first and second portions of a flow path to said tapered faces for said liquid, and at least one bore extending from the second conduit to the exterior of said second body member thereby forming an additional portion of said flow path from said second conduit to said tapered faces for the atomizing operation.

2. A velocity transformer device as claimed in claim 1 in which said first conduit extends in said first body member adjacent the junction of the first and second body members whereby said first portion of said flow path is positioned at a node in the vibrations.

3. A velocity transformer device as claimed in claim 2 in which more than one bore is provided, said bores extending directly between said inclined faces and the said second conduit and emerging at said inclined faces at an angle perpendicular to said faces to thereby cause uniform dispersion of said liquid.

4. A velocity transformer device as claimed in claim 2 in which more than one bore is provided, said bores extending from said second conduit to the exterior of the second body member above said tapered faces whereby liquid emerging from the said bores may flow by gravity down to the said tapered faces for the atomizing operation.

5. A velocity transformer device as claimed in claim 3 in which the said tapered faces form a conical tip at the end of the said second body member whereby during said atomizing operation said liquid is directed outwardly in all directions.

6. A velocity transformer device as claimed in claim 4 in which the said tapered faces form a conical tip at the end of the said second body member whereby during said atomizing operation said liquid is directed outwardly in all directions.

7. A velocity transformer device as claimed in claim 2 in which the first body member comprises a cylindrical portion, and a tapered end portion remote from the second body member for housing said vibration means, the end portion being of the same cross section as the cylindrical portion adjacent the cylindrical portion and tapering inwardly away from the cylindrical portion toward said vibrating means.

8. An ultrasonic feeding device for liquid comprising a velocity transformer having an elongated body formed with first and second stepped parts, the first part being of larger cross section than the second part and the second part being provided with a conical projecting tip having outwardly facing inclined atomizing faces at its end remote from the first part, an ultrasonic frequency vibration device coupled to the end of the said first part remote from the said second part, a first conduit extending through said first part adjacent the junction of the first and second parts at a vibration node transverse to the longitudinal axis of said elongated body for receiving said liquid, a second conduit in communication with the first conduit and extending along said axis through at least a part of the second part, said first and second conduits forming first and second portions of a flow path to said inclined faces for said liquid, and a plurality of bores extending from the said second conduit to the exterior of the said second part forming an additional portion of said flow path to said inclined faces of the said conical tip whereby liquid may be atomized in all directions at said inclined faces.

References Cited by the Examiner
UNITED STATES PATENTS

| | | | |
|---|---|---|---|
| 1,844,527 | 2/1932 | Rees | 239—271 |
| 3,075,707 | 1/1963 | Rademaker | 239—533 |
| 3,114,654 | 12/1963 | Nishiyama et al. | 239—102 |
| 3,145,931 | 8/1964 | Cleall | 239—102 |
| 3,162,368 | 12/1964 | Choate et al. | 239—102 |
| 3,240,253 | 3/1966 | Hughes | 239—102 |

EVERETT W. KIRBY, *Primary Examiner.*